United States Patent [19]

Filderman et al.

[11] Patent Number: 4,525,159
[45] Date of Patent: Jun. 25, 1985

[54] BELT AND PULLEY TRANSMISSION

[75] Inventors: René Filderman, Neuilly sur Seine; Michel Pilache, Maisons Lafitte, both of France

[73] Assignee: Valeo, Paris, France

[21] Appl. No.: 662,793

[22] Filed: Oct. 19, 1984

Related U.S. Application Data

[63] Continuation of Ser. No. 320,940, Nov. 13, 1981.

[51] Int. Cl.³ .................... F16G 1/00; F16G 5/00; F16G 1/21; F16G 1/22
[52] U.S. Cl. .................................. 474/201; 474/242; 474/244
[58] Field of Search ............... 474/201, 242, 244, 245, 474/272; 156/137, 138, 139; 29/420, 420.5

[56] References Cited

U.S. PATENT DOCUMENTS

| | | | |
|---|---|---|---|
| 2,343,367 | 3/1944 | Conradson | 474/244 |
| 2,608,875 | 9/1952 | Ellison et al. | 474/242 |
| 3,044,316 | 7/1962 | Forster | 474/242 |
| 3,720,113 | 3/1973 | Van Doorne et al. | 474/242 |
| 3,860,684 | 1/1975 | Vance, Sr. | 474/264 |
| 4,080,841 | 3/1978 | Vollers | 474/201 |
| 4,108,011 | 8/1978 | Gregg et al. | 474/153 |
| 4,177,687 | 12/1979 | Russ, Sr. | 474/242 |
| 4,299,586 | 11/1981 | Van der Hardt Aberson | 474/201 |
| 4,303,403 | 12/1981 | Lamers | 474/242 |
| 4,338,081 | 7/1982 | Hattori et al. | 474/201 |
| 4,342,561 | 8/1982 | Braybrook | 474/242 |
| 4,365,965 | 12/1982 | Russ, Sr. | 474/201 |
| 4,433,965 | 2/1984 | Hattori et al. | 474/272 |

FOREIGN PATENT DOCUMENTS

| | | | |
|---|---|---|---|
| 0000802 | 2/1979 | European Pat. Off. | 474/201 |
| 1066329 | 1/1954 | France . | |
| 2089587 | 12/1971 | France . | |
| 2327452 | 5/1977 | France . | |
| 2416091 | 8/1979 | France . | |
| 1549403 | 8/1979 | United Kingdom | 474/201 |

Primary Examiner—Lawrence J. Staab
Assistant Examiner—Michael D. Bednarek
Attorney, Agent, or Firm—Young & Thompson

[57] ABSTRACT

The invention relates to a belt and pulley transmission which is preferably but not essentially an infinitely variable transmission. The belt is formed from a stack of individual blocks working in compression and supported on one or more support bands. According to the invention, the blocks are formed from sintered metal material, while the bands which support and compress the blocks are made from aramide fibres, such as KEVLAR. Every tenth block is of sintered bronze, to reduce the risk of seizing, the remaining blocks being of sintered iron.

7 Claims, 6 Drawing Figures

BELT AND PULLEY TRANSMISSION

This application is a continuation of application Ser. No. 320,940, filed 11/13/81.

BACKGROUND OF THE INVENTION

The present invention relates to a transmission comprising a belt passing over pulleys and composed of a stack of blocks working in compression and supported by one or more bands.

A transmission of this type is usually a variable ratio transmission. For this purpose the inner face of the cheeks of each pulley is conical, and these cheeks can be moved axially towards and away from one another. The blocks have a trapezoidal shape complementary to that of the conical surfaces of the pulley cheeks. Thus, when the pulley cheeks are noved towards and away from one another the blocks rise or fall radially along the cheeks while remaining in continuous contact with them, thus providing a transmission ratio which is variable in dependence on the ratio of the mean radii on which the blocks are working on the two pulleys.

As a rule, in such a transmission, the blocks are of sheet iron and the bands are made of steel. The entire device is lubricated.

The object of the present invention is to provide a belt and pulley transmission of the kind indicated above, in which the conditions of assembly and operation are improved and which can work without lubrication.

SUMMARY

According to one aspect of the invention a transmission of this kind is characterized in that the blocks are made of sintered metal.

Consequently, the coefficient of friction of the blocks in relation to the cheeks of the pulleys can be substantially increased. In this way, the conditions of driving contact between the blocks and the pulley cheeks are improved and the risk of circumferential slipping of the blocks over the pulley cheeks is considerably reduced, thus providing improved power transmission. The axial clamping force necessary between the cheeks is also reduced.

According to another characteristic of the invention, the sintered metal blocks, or at least some of them, are based on iron and have the following composition by weight:
 Iron—80 to 94%
 Copper or molybdenum bisulphide—0.5 to 5%
 Nickel—1 to 5%
 Graphite—3 to 10%
 Coke—0 to 10%

With a composition of this kind, the blocks have a coefficient of friction of the order of 0.5 in relation to the pulley cheeks, as compared with 0.3 when the blocks are of sheet iron.

In another arrangement, the sintered metal blocks, or at least some of them, are based on bronze and have the following composition by weight:
 Copper—80 to 92%
 Tin—4 to 10%
 Graphite—3 to 10%
 Coke—0 to 5%

Sintered metal blocks of this type, based on bronze, have a coefficient of friction of the order of 0.2 and are used simultaneously with the iron based sintered metal blocks, but in a smaller number than the latter and distributed among the iron based blocks. For example, one bronze based sintered metal block is advantageously provided for nine iron based sintered metal blocks.

As the result of this arrangement, excellent driving conditions are achieved while the risk of seizing is reduced.

According to another characteristic of the invention, the sintered metal blocks are made anisotropic, with a coefficient of friction on the pulleys which is higher in a circumferential direction than in a radial direction.

These anisotropic sintered metal blocks have the following composition by weight:
 Iron—0 to 43%
 Steel wool—50 to 80%
 Graphite—5 to 20%
 Molybdenum bisulphide—1 to 5%
 Coke—0 to 7%
 Nickel—1 to 5%

With this type of block, excellent driving contact is obtained between the blocks and each pulley in the circumferential direction, together with excellent conditions of transmission ratio variation, since the blocks can slide easily in the radial direction on the pulleys.

An anisotropic property of this kind results from the fact that the steel wool contained in the composition of the sintered blocks is allowed to orient itself in planes perpendicular to the face of contact of the blocks with the cheeks, but never transversely, so that a kind of cleavage is obtained which increases the coefficient of friction in the circumferential direction and reduces it in the radial direction.

According to another aspect of the invention, the or each support band of the blocks is made from aramide fibres, such as "KEVLAR", which may be coated with elastomer material, such as rubber. The rubber absorbs the relative movements between the blocks and the belt and is advantageously used when the belt works without lubrication.

"KEVLAR" fibres have a tensile strength three times that of ordinary steels, and have a greater bending capacity. These properties have the result of facilitating the winding of the blocks on the pulleys, particularly on variation of the transmission ratio. In view of the fact that "KEVLAR" has an elongation greater than that of steel, it is possible for the bands to compress the blocks more heavily, thus facilitating the assembly of the belt and also the taking-up of play during the operation of the transmission. In addition, the belt according to the invention makes it possible to reduce operating noise.

The two above mentioned aspects of the invention are preferably combined such that the blocks are of sintered metal according to any of the aforementioned embodiments, while the or each guide band is of aramide fibres such as "KEVLAR", which may be coated with elastomer material such as rubber.

The invention also comprehends a drive belt of the kind described for use in a belt drive transmission.

DESCRIPTION OF THE PREFERRED EMBODIMENTS

The embodiment illustrated in FIGS. 1 to 4 relates, as a non-limitative example, to an application of the invention to a transmission comprising a belt 10 and pulleys 11 and 12, with a variable transmission ratio.

The belt 10 passes over the pulleys 11 and 12 and is composed of a stack of blocks 13 working in compression and supported by one or more bands 14 (two bands 14 in the example shown).

Figure 1:
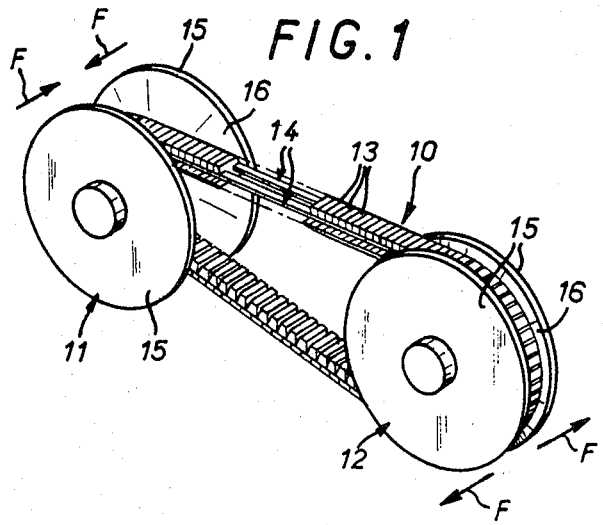
FIG. 1 is a schematic view in perspective of a belt and pulley transmission according to the invention.
Figure 4:
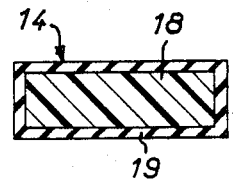
FIG. 4 is a view on a still larger scale and in section of one of the guide bands for the blocks.
Figure 2:
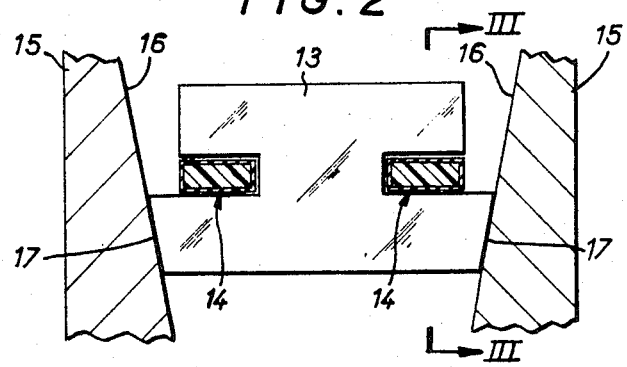
FIG. 2 is a view on a larger scale and in cross-section of the belt between the cheeks of a pulley.

Each pulley 11, 12 has two cheeks 15 adapted to be moved away from and towards one another axially (arrows F, FIG. 1). The inside surface 16 of each cheek 15 is conical. Each block 13 has a trapezoidal shape with inclined bearing surfaces 17, the angle of which corresponds to the conicity of the inside surfaces 16 of the cheeks 15.

When the cheeks 15 are brought closer to one another, the blocks 13 rise radially along these cheeks 15 and work on a larger radius. Conversely, when the cheeks 15 are moved further apart, the blocks 13 fall radially along these cheeks and work on a smaller radius.

When the cheeks 15 of the pulley 11 are brought closer to one another while the cheeks 15 of the pulley 12 are moved apart, there is change of the transmission ratio in a given direction. In the opposite case the transmission ratio is changed in the opposite direction.

The blocks 13 are of sintered metal.

Nine blocks 13 out of ten are of iron based sintered metal and have the following composition by weight:

Iron—80 to 94.5%
Copper or molybdenum bisulphide—0.5 to 5%
Nickel—1 to 5%
Graphite—3 to 10%
Coke—0 to 10%

For the sintering of these iron based sintered metal blocks the powder formed by the components indicated above is compressed under a pressure of 2 to 8 tonnes per square centimeter.

This compression is advantageously effected by pelletising with a press having a floating die and an ejection punch opposite a compression punch, so as to effect bilateral compression promoting uniformity of compaction in the resulting pellet.

This compressed pellet is then introduced into an oven at a temperature of the order of 1000° to 1100° C. After firing in the oven, the sintered blocks are subjected to additional compression.

These iron based sintered metal blocks have a coefficient of friction of the order of 0.5 in relation to the cheeks 15.

It will be appreciated that these blocks have little tendency to seize, because of the graphite, that they are resistant to wear because of the coke, and that they have excellent durability because of the nickel. The purpose of the copper or molybdenum sulphide is to facilitate the sintering.

One sintered metal block out of ten is based on bronze and has the following composition by weight:

Copper—80 to 92%
Tin—4 to 10%
Graphite—3 to 10%
Coke—0 to 5%

The sintering is effected under similar conditions to those described for the iron based sintered metal blocks, but the firing in the oven takes place at a temperature of the order of 700° to 800° C. instead of 1000° to 1100° C. in the case of the iron based sintered metal blocks.

These bronze based sintered metal blocks have a coefficient of friction of the order of 0.2 in relation to the cheeks 15.

This arrangement of sintered metal blocks 13, some based on iron and other based on bronze and distributed among the iron based blocks, permits excellent operating conditions.

Figure 3:
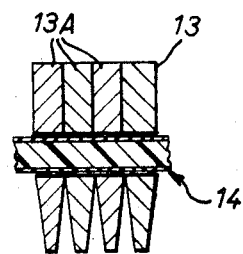
FIG. 3 is a corresponding view in section on the line III—III in FIG. 2.

It is preferable that the blocks 13 should not all have the same dimensions, some of them, designated 13A in FIG. 3, being less thick than the other blocks 13. This makes it possible to facilitate the winding of the belt 10 over the pulleys 11 and 12 and to improve operating conditions when changes of the transmission ratio are made.

The bands 14 supporting the blocks 13 are made of aramide fibres 18, such as "KEVLAR" fibres (FIG. 4) coated in elastomer material 19, such as rubber.

"KEVLAR" has the following characteristics:

Density: 1.5
Tensile strength: 300 kg per mm$^2$
Elongation at break: 4%
Modulus of elasticity: 13,000 kg per mm$^2$ These characteristics are, for the application considered, better than those of steel, which are as follows:

Density: 7.5
Tensile strength: 100 kg per mm$^2$
Elongation at elastic limit: 0.5%
Modulus of elasticity: 20,000 kg per mm$^2$ The support bands 14 composed of "KEVLAR" fibres 18 coated with rubber 19 thus have a considerably better performance than steel bands.

In particular, the juxtaposition of the blocks 13 one against the other entails no difficulty in the assembling of the blocks 13 on the bands 14, because of the possible substantial elongation of these bands (4% instead of 0.5%).

In the course of operation no wear phenomena are observed, particularly between the blocks 13 and the bands 14, thus avoiding differences in position when the blocks 13 come into contact with the pulleys 11 and 12. In this way no additional tensile stress is applied to the bands 14. Moreover, no bruising phenomena are observed between the blocks. There is practically no danger of seizing, so that it is possible to dispense with all lubrication of the arrangement. In addition, the transmission is very quiet.

It will also be appreciated that in the transmission according to the invention the weight of the belt 10 composed of the sintered blocks 13 and the "KEVLAR" bands 14 is less than that of a belt composed of sheet iron blocks and steel bands, thus making it possible to reduce the tensile strength resulting from centrifugal force.

Figure 5:
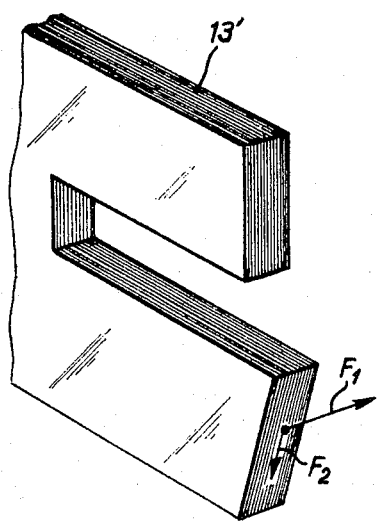
FIG. 5 is a partial view in perspective of a modified form of block having anisotropic properties with a higher coefficient of friction in a circumferential direction than in a radial direction, which is due to a distribution of the steel wool fibres in planes parallel to the face of the block.
Figure 6:
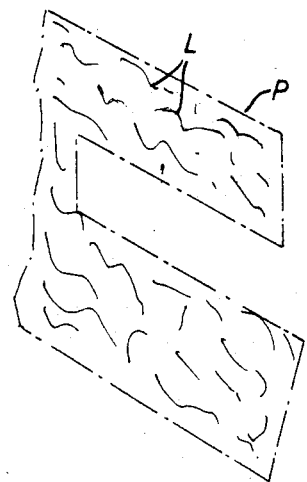
FIG. 6 shows schematically one of these planes, in which it can be seen that the fibres are all disposed in this plane and not transversely to it.

An an alternative (FIGS. 5 and 6) the arrangement is similar to that described in connection with FIGS. 1 to 4, but each block of sintered metal designated 13' is anisotropic and has a coefficient of friction on the pulleys which is higher in a circumferential direction (arrow F1) than in a radial direction (arrow F2).

For this purpose the sintered metal block 13' contains steel wool fibres L (FIG. 6) which are disposed in planes P at right angles to the friction face of the block 13' and which do not extend transversely to these planes P.

A kind of cleavage along the planes P is thus achieved in the block 13'. In the direction F1 the block 13' exhibits in succession a plurality of interfaces which increase the coefficient of friction F1 in a circumferential direction, while the coefficient of friction F2 in the radial direction is reduced. As an example, the coefficient of friction F1 is of the order of 0.5, which permits excellent conditions of circumferential driving of the blocks 13' by the pulleys, while in a radial direction the coefficient of friction F2 is of the order of 0.2, thus permitting easy radial sliding of the blocks 13' in relation to the pulleys when changes of the transmission ratio are made.

The anisotropic blocks 13' of sintered metal preferably have the following composition by weight:

Iron—0 to 43%
Steel wool—50 to 80%
Graphite—5 to 20%
Molybdenum bisulphide—1 to 5%
Coke—0 to 7%
Nickel—1 to 5%

The sintering is effected under similar conditions to those described previously. The anisotropy results from the pelletisation in a press, which has the effect of disposing the steel wool fibres in the planes P.

I claim:

1. A belt drive transmission comprising a nonlubricated push block belt passing over pulleys, said push block belt comprising a stack of blocks carried by at least one support band, said blocks being made of sintered metal, at least one of said blocks having a coefficient of friction with said pulleys which is substantially lower than that of the rest of said blocks, said blocks of sintered metal and the said at least one block all haing sufficient lateral extend to engage the pulleys when passing about the pulleys.

2. A belt drive transmission according to claim 1, wherein there is a plurality of blocks having a lower coefficient of friction interspersed among the rest of said blocks.

3. A belt drive transmission according to claim 2, wherein most of said blocks are of higher coefficient of friction with said pulleys than said plurality of blocks.

4. A belt drive transmission according to claim 3, wherein there is one block having a lower coefficient of friction for every ten blocks of said belt.

5. A belt drive transmission according to claim 1, wherein the coefficient of friction of said at least one block is about 0.2 and the coefficient of friction of the rest of sid blocks is about 0.5.

6. A belt drive transmission according to claim 2, wherein the coefficient of friction of said plurality of blocks is about 0.2 and the coefficient of friction of the rest of said blocks is about 0.5.

7. A belt drive transmission according to claim 3, wherein the coefficient of friction of said one block is about 0.2 and the coefficient of friction of the rest of said blocks is about 0.5.

* * * * *